UNITED STATES PATENT OFFICE.

ALBERT PRUESSMAN, OF EAST ORANGE, NEW JERSEY, ASSIGNOR TO WESTERN ELECTRIC COMPANY, INCORPORATED, OF NEW YORK, N. Y., A CORPORATION OF NEW YORK.

CONDENSER AND METHOD OF MAKING THE SAME.

15,241. Specification of Reissued Letters Patent. Reissued Nov. 29, 1921.

No Drawing. Original No. 1,275,468, dated August 13, 1918, Serial No. 183,131, filed July 27, 1917. Application for reissue filed June 14, 1920. Serial No. 388,995.

*To all whom is may concern:*

Be it known that I, ALBERT PRUESSMAN, a citizen of the United States, residing at East Orange, in the county of Essex and State of New Jersey, have invented certain new and useful Improvements in Condensers and Methods of Making the Same, of which the following is a full, clear, concise, and exact description.

This invention relates to condensers and a method of making the same, its object being to provide an improved method of treating condensers to prevent a permanent change in their electrical constants as a result of normal temperature changes.

In composite circuits, which are used for the simultaneous sending of telephone and telegraph messages, the requirements are such as to demand condensers which are very closely balanced in electrical constants with respect to each other. Also in connection with various other electrical circuits or networks, there is a considerable demand for condensers, the electrical constants of which are necessarily held to very close limits in order that the circuits may function properly. By following a process of selection, it is possible to obtain groups of condensers which initially meet the various requirements, but experience has shown that such condensers, even though made in the same manner and in fact in the same lot, may vary considerably from each other after being subjected to temperature changes to be expected under normal operating conditions. It is, therefore, the object of the present invention to provide a method of treatment which, when applied to the standard type of condensers, will insure that their electrical constants are not permanently affected to an appreciable amount by normal changes in temperature.

The type of condensers most commonly used in telephone practice consists of alternate strips or layers of metal foil and insulating material, such as paper, rolled into a cylindrical or elliptical form. After this unit is wound, it is given a treatment to make it impervious to moisture. Various methods are employed to attain this result, one which has been found to be particularly satisfactory being described in detail in United States Patent 1,127,513, granted to the applicant on February 9, 1915. This method consists essentially in baking the wound unit to expel all moisture, and then boiling it in melted paraffin wax or an equivalent material. As the unit is allowed to cool, it is shaped by slight pressure applied to the flat sides thereof, after which it is dipped into an insulating compound and then placed in a metal container, which is later completely filled with the insulating compound.

The additional treatment contemplated by this invention consists in placing the treated unit in an oven, which is maintained at a temperature greater than the melting point of the impregnating wax and leaving it at this temperature for a given period of time, after which it is allowed to cool. During this treatment, any stresses, due to unequal winding or unequal pressure during the shaping process, become equalized and the unit is free to take its natural shape, or, so to speak, to take a permanent set, after which there will be no further tendency for change in shape, even though the impregnating wax is in a fluid state. In the case of condensers which are impregnated with a paraffin wax, the solidifying temperature of which is approximately 120° F., a satisfactory treatment has been found to consist in placing the condensers in an upright position in an oven, the temperature of which is maintained at approximately 140° F., and leaving them there for a period of from four to six hours, after which they are allowed to cool. Extensive tests made on condensers so treated indicate that no appreciable change of a permanent nature will take place as a result of temperature changes such as would be experienced under normal operating conditions.

What is claimed is:

1. The method of treating a condenser impregnated in the presence of heat, which consists in applying pressure to the impregnated condenser as it cools and then removing the pressure and reheating the condenser to a temperature of not less than 120° F. for a period of not less than three hours without pressure applied thereto.

2. The method of treating a condenser impregnated in the presence of heat, which consists in applying pressure to the impregnated condenser as it cools and then removing the pressure and reheating the condenser at a temperature equal to the melting point of the impregnating compound without pressure applied thereto for a time sufficient to permit it to expand to a shape approximately its shape prior to compression.

3. The method of treating a condenser impregnated in the presence of heat, which consists in applying pressure to the impregnated condenser as it cools and then removing the pressure and reheating the condenser without pressure applied thereto for a period of not less than three hours at a temperature equal to the melting point of the impregnating compound.

4. The method of treating a condenser impregnated in the presence of heat, which consists in applying pressure to the impregnated condenser as it cools and then removing the pressure and reheating the condenser without pressure applied thereto until the entire condenser has reached a temperature equal to the melting point of the impregnating material.

5. The method of treating a condenser impregnated in the presence of heat, which consists in giving the condenser a shape while cooling, and then reheating the condenser until it has reached a temperature equal to the melting point of the impregnating material whereby it assumes a different shape.

6. The method of treating a condenser having a certain shape and impregnated in the presence of heat, which consists in applying pressure to the condenser as it cools to give it a different shape and then reheating the condenser without pressure applied thereto to permit it to assume a shape approximately like its first-mentioned certain shape.

7. The method of treating a condenser impregnated in the presence of heat which consists in applying pressure to the condenser as it cools, removing the pressure, potting the condenser in a container having a cross-sectional dimension greater than the cross-sectional dimension of the compressed condenser, and reheating the potted condenser to permit it to assume a shape having a cross-sectional dimension greater than it had after being compressed.

8. The method of treating a rolled condenser impregnated in the presence of heat, consisting in applying pressure to the condenser as it cools to flatten the sides thereof, and then reheating the condenser without pressure applied thereto until it reaches a temperature equal to the melting point of the impregnating material to permit it to assume again an approximate roll shape.

9. The method of treating a condenser impregnated in the presence of heat which consists in applying pressure to the condenser as it cools to reduce its cross-sectional dimension, and then reheating the condenser without pressure applied thereto to permit it to expand.

10. The method of treating a condenser impregnated in the presence of heat, which consists in applying pressure to the condenser as it cools and then reheating the condenser without pressure applied thereto until it reaches a temperature equal to the melting point of the impregnating compound to permit the condenser to expand.

In witness whereof, I hereunto subscribe my name this 7th day of June 1920.

ALBERT PRUESSMAN.